United States Patent
Mathews et al.

(10) Patent No.: US 12,067,377 B2
(45) Date of Patent: Aug. 20, 2024

(54) SYSTEM AND A METHOD FOR AUTOMATIC GENERATION OF SMART CONTRACTS ACROSS BLOCKCHAIN PLATFORMS

(71) Applicant: Mphasis Limited, Bangalore (IN)

(72) Inventors: Biju Mathews, Bangalore (IN); Sanjeev Kumar Madhavan, Palakkad (IN); Karthik Ganti, Nagpur (IN); Chakkirala Venkata Sai Kalyani, Nellore (IN); Agnelo Marques, Mumbai (IN)

(73) Assignee: MPHASIS LIMITED, Bangalore (IN)

( * ) Notice: Subject to any disclaimer, the term of this patent is extended or adjusted under 35 U.S.C. 154(b) by 74 days.

(21) Appl. No.: 17/903,136

(22) Filed: Sep. 6, 2022

(65) Prior Publication Data
US 2023/0072988 A1 Mar. 9, 2023

(30) Foreign Application Priority Data
Sep. 6, 2021 (IN) .............................. 202141040359

(51) Int. Cl.
*G06F 8/30* (2018.01)
*G06F 8/41* (2018.01)

(52) U.S. Cl.
CPC ................ *G06F 8/30* (2013.01); *G06F 8/427* (2013.01)

(58) Field of Classification Search
CPC ................................... G06F 8/30; G06F 8/427
(Continued)

(56) References Cited

U.S. PATENT DOCUMENTS 8,060,857 B2 * 11/2011 Biggerstaff ............... G06F 8/76
717/136
10,243,743 B1 * 3/2019 Madisetti .............. H04L 9/3247
(Continued)

FOREIGN PATENT DOCUMENTS

CN 112015396 A 12/2020

OTHER PUBLICATIONS

Wöhrer, Maximilian, and Uwe Zdun. "Domain specific language for smart contract development." 2020 IEEE International Conference on Blockchain and Cryptocurrency (ICBC). IEEE, 2020.pp.1-9 (Year: 2020).*
(Continued)

*Primary Examiner* — Satish Rampuria
(74) *Attorney, Agent, or Firm* — CANTOR COLBURN LLP

(57) ABSTRACT

The present invention provides for a system (100) and a method for generating smart contracts for blockchain platforms. An input received as natural language text is processed into a first parameter to generate a Domain Specific Language (DSL) construct. DSL construct is disintegrated into a stream of tokens and a syntax analysis is performed on the stream of tokens to check if the syntax of the DSL construct matches with a grammar file defined for the DSL construct. Each of the marked lines of the stream of tokens is read and the read marked lines are transformed into an organized structure. A file specific to a target blockchain platform is generated based on a second parameter and the organized structure is mapped with the generated file associated with the target blockchain platform to generate a target code template for generating a deployable target smart contract for the target blockchain platform.

27 Claims, 3 Drawing Sheets

(58) Field of Classification Search
USPC .................................................. 717/104–178
See application file for complete search history.

(56) References Cited

U.S. PATENT DOCUMENTS

| | | | |
|---|---|---|---|
| 10,871,948 | B1 | 12/2020 | Dowling |
| 11,257,073 | B2* | 2/2022 | Padmanabhan ........... H04L 9/50 |
| 11,816,453 | B1* | 11/2023 | Dowling ................. G06Q 20/02 |
| 2009/0241094 | A1* | 9/2009 | Sikka ........................ G06F 8/31 |
| | | | 717/127 |
| 2020/0034469 | A1* | 1/2020 | Sato .................... G06F 16/1834 |
| 2020/0357084 | A1* | 11/2020 | Lerato Hunn ...... G06F 16/2379 |
| 2021/0026599 | A1 | 1/2021 | Bartolucci |
| 2021/0241273 | A1* | 8/2021 | Abad .................... H04L 9/3239 |

OTHER PUBLICATIONS

Frantz, Christopher K., and Mariusz Nowostawski. "From institutions to code: Towards automated generation of smart contracts." 2016 IEEE 1st International Workshops on Foundations and Applications of Self* Systems (Fas* W). IEEE, 2016.pp.210-215 (Year: 2016).*

Wickramarachchi, V. U., C. I. Keppitiyagama, and K. G. Gunawardana. "Efficiently transform contracts written in Peyton Jones contract descriptive language to Solidity." 2019 19th International Conference on Advances in ICT for Emerging Regions (ICTer). vol. 250. IEEE, 2019.pp. 1-8 (Year: 2019).*

Gorski, Tomasz, and Jakub Bednarski. "Applying model-driven engineering to distributed ledger deployment." IEEE Access 8 (2020): pp. 118245-118261. (Year: 2020).*

Steffen, Samuel, et al. "zkay: Specifying and enforcing data privacy in smart contracts." Proceedings of the 2019 ACM SIGSAC conference on computer and communications security. 2019. pp. 1759-1776 (Year: 2019).*

Klomp, Rick, and Andrea Bracciali. "On symbolic verification of Bitcoin's script language." Data Privacy Management, Cryptocurrencies and Blockchain Technology: ESORICS 2018 International Workshops, Barcelona, Spain, Sep. 6-7, 2018, Proceedings 13. Springer International Pub, pp. 1-16 (Year: 2018).*

Hamdaqa Mohammad Mhamdaqa@Ru Is et al.: "iContractML A Domain-Specific Language for Modeling and Deploying Smart Contracts onto Multiple Blockchain Platforms", Oct. 19-20, 2020, Canada, Virtual Event.

Qasse Ilham et al.: "iContractBot: A Chatbot for Smart Contracts' Specification and Code Generation", 2021, IEEE/ACM Third International Workshop on BOTS in Software Engineering (BotSE).

Tateishi T et al: "Automatic smart contract generation using controlled natural language and template", 2019.

Wohrer Maximilian et al: "Domain Specific Language for Smart Contract Development", University of New South Wales. Downloaded on Sep. 27, 2020.

* cited by examiner

SYSTEM AND A METHOD FOR AUTOMATIC GENERATION OF SMART CONTRACTS ACROSS BLOCKCHAIN PLATFORMS

CROSS REFERENCE TO RELATED APPLICATION

This application is related to and claims the benefit of Indian Patent Application Number 202141040359 filed on Sep. 6, 2021, the contents of which are herein incorporated by reference in their entirety.

FIELD OF THE INVENTION

The present invention relates generally to the field of blockchain platforms, and more particularly, the present invention relates to a system and a method for automatic generation of smart contracts for different types of blockchain platforms.

BACKGROUND OF THE INVENTION

Blockchain is a distributed electronic ledger that records transactions between source addresses and destination addresses and may be implemented in various fields. Blockchain is representative of a data structure that stores a list of transactions. The transactions are bundled into blocks and every block except for the first block is linked to a prior block in the chain. A blockchain is typically managed by a peer-to-peer network collectively adhering to a protocol for validating new blocks and the transactions contained in the corresponding block.

Smart contracts are programs stored on blockchain platforms that include rules which define functionalities to be implemented by the smart contracts for executing transactions between users of the blockchain platforms. Typically, code for generating smart contracts is written into blockchain platforms and must be written each time a new blockchain platform is used. Each of the platforms has its own specification, own development tool and its own programing language. As such, for each blockchain platform, rules have to be defined to write a blockchain specific code in a specific format that is supported by the platform to run the smart contracts directly on the blockchain ledger, which is a time consuming and tedious process. Also, developers and testers with multiple skills are required which poses a challenging situation on account of skill shortage and proclivity of human errors.

Although currently some tools exist that allow code to be generated from mark-up language, it has been observed that such tools are posed with challenges. These tools use a mark-up language that still require technical developers to write the mark-up, which again is not only a time-consuming task but also makes it difficult for users without technical know-how to use the blockchain platform. Moreover, the mark-up languages are specific to a platform and each time for a new platform the mark-up language must be written. Existing systems, therefore, require huge skill and development effort, are complex, and are also prone to human error apart from being expensive. Further, the existing systems require testing each time before deployment for removing human errors which is an additional activity that require additional time, effort and cost.

In light of the above drawbacks, there is a need for a system and a method for automatically generating smart contracts for different types of blockchain platforms. There is a need for a system and a method for automatic code generation for blockchain smart contracts which is agnostic to the underlying platform and can be used for multiple existing and future blockchain platforms. There is a need for a system and a method for automatic code generation for blockchain smart contracts such that the platforms can be used without the need to write codes or having the technical know-how to generate codes and consequently requiring reduced time, complexity, development effort, skill and cost. There is a need for a system and method for generating smart contracts which is tested once and implemented multiple times. There is a need for a system and method for generating smart contracts that accelerate blockchain solutions.

SUMMARY OF THE INVENTION

In various embodiments of the present invention, a system for generating smart contracts for blockchain platforms is provided. The system comprises a memory storing program instructions and a processor executing program instructions stored in the memory. The processor is configured to execute a template generator engine to process input received as a natural language text into a first parameter to generate a Domain Specific Language (DSL) construct. The template generator engine is configured to disintegrate the DSL construct into a stream of tokens. The template generator engine is configured to perform a syntax analysis on the stream of tokens to check if the syntax of the DSL construct matches with a grammar file defined for the DSL construct wherein the lines in the steam of tokens without error are marked. The template generator engine is configured to read each of the marked lines of the stream of tokens and transform the read marked lines into an organized structure. The template generator engine is configured to generate a file specific to a target blockchain platform based on a second parameter and map the organized structure with the generated file associated with the target blockchain platform to generate a target code template for generating a deployable target smart contract for the target blockchain platform.

In various embodiments of the present invention, a method for generating smart contracts for blockchain platforms is provided. The method comprises processing, by a processor, input received as a natural language text into a first parameter to generate a Domain Specific Language (DSL) construct and disintegrating the DSL construct into a stream of tokens. The method comprises performing a syntax analysis on the stream of tokens to check if the syntax of the DSL construct matches with a grammar file defined for the DSL construct, wherein the lines in the steam of tokens without errors are marked. The method further comprises reading each of the marked lines of the stream of tokens and transforming the read marked lines into an organized structure. The method comprises generating a file specific to a target blockchain platform based on a second parameter and mapping the organized structure with the generated file associated with the target blockchain platform to generate a target code template for generating a target smart contract for the target blockchain platform.

In various embodiment of the present invention, a computer program product is provided. The computer program product comprises a non-transitory computer-readable medium having computer program code stored thereon, the computer-readable program code comprising instructions that, when executed by a processor, causes the processor to process input received as a natural language text into a first parameter to generate a Domain Specific Language (DSL) construct and disintegrate the DSL construct into a stream of tokens. A syntax analysis is performed on the stream of tokens to check if the syntax of the DSL construct matches with a grammar file defined for the DSL construct, wherein the lines in the steam of tokens without error are marked. Each of the marked lines of the stream of tokens is read and the read marked lines are transformed into an organized structure. A file specific to a target blockchain platform is generated based on a second parameter and the organized structure is mapped with generated file associated with the target blockchain platform to generate a target code template for generating a deployable target smart contract for the target blockchain platform.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
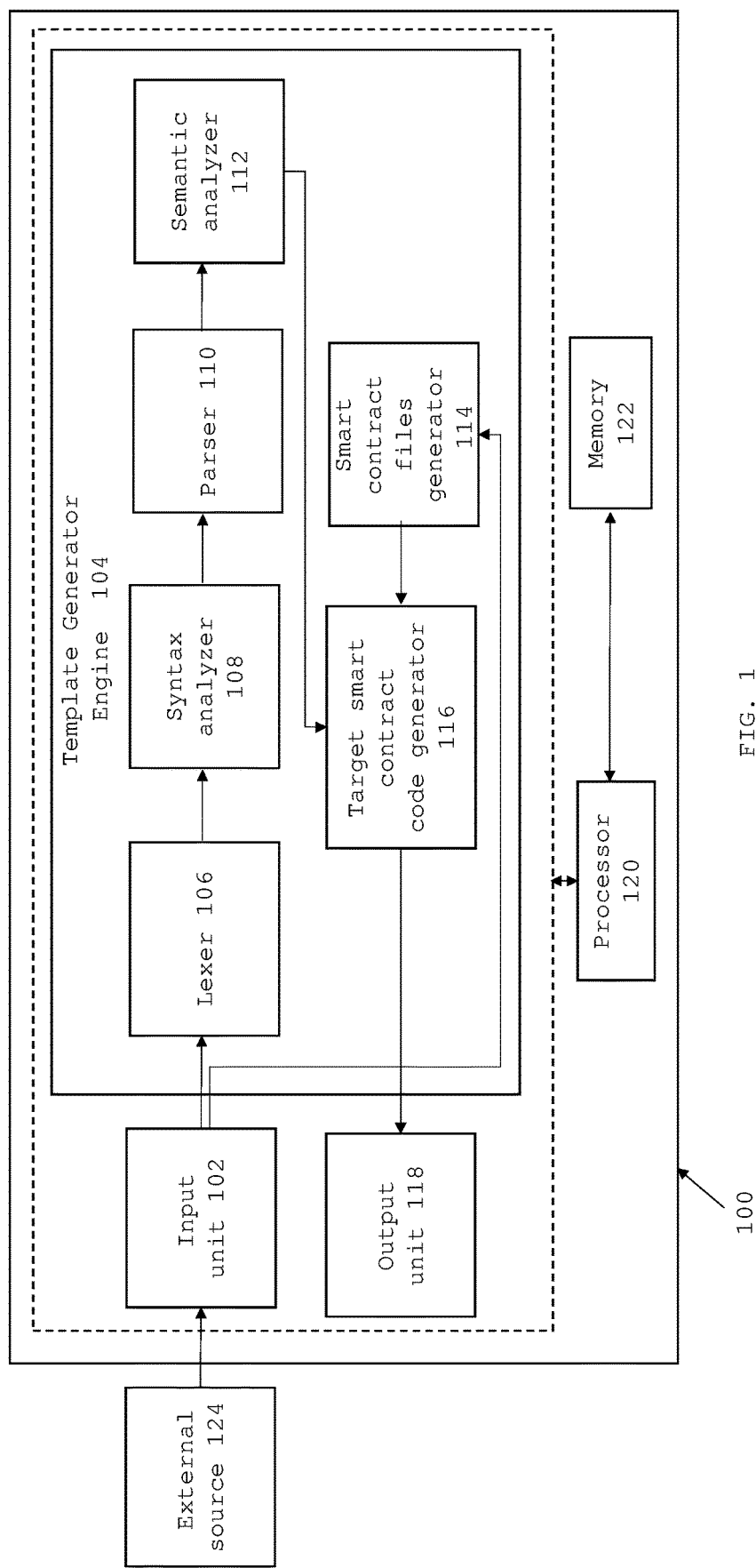
FIG. 1 illustrates a block diagram of a system for automatic generation of smart contracts for different types of blockchain platforms, in accordance with various embodiments of the present invention.

FIG. 1 illustrates a block diagram of a system for automatic generation of blockchain smart contracts for different types of blockchain platforms, in accordance with various embodiments of the present invention. Referring to FIG. 1, in an embodiment of the present invention, the system 100 comprises an input unit 102, a template generator engine 104 and an output unit 118. The system 100 is in communication with an external source 124 over a communication channel. The communication channel may include a physical transmission medium, such as, a wire, or a logical connection over a multiplexed medium, such as, a radio channel in telecommunications and computer networking. The examples of radio channel in telecommunications and computer networking may include a Local Area Network (LAN), a Metropolitan Area Network (MAN), and a Wide Area Network (WAN).

In an embodiment of the present invention, the template generator engine 104 comprises a lexer 106, a syntax analyzer 108, a parser 110, a semantic analyzer 112, a smart contract file generator 114, and a target smart contract code generator 116. The various units of the template generator engine 104 are operated via the processor 120 specifically programmed to execute instructions stored in the memory 122 for executing respective functionalities of the units of the template generator engine 104 in accordance with various embodiments of the present invention.

In an embodiment of the present invention, the system 100 is a tool for generating smart contracts for multiple and diverse blockchain platforms. Examples of blockchain platforms include, but are not limited to, Ethereum® and R3 Corda®. Smart contracts are programs stored on blockchain platforms and are executed after predetermined conditions are met for a particular transaction. Examples of transactions may include issuing tickets, registering vehicles, releasing funds to parties etc. The predetermined conditions are a set of rules based on which an agreement between users of the blockchain platform are automatically executed for ascertaining an outcome of a particular transaction without involvement of any third-party or intermediary. For example, in the event of goods arriving on time and found to be in expected and acceptable condition, the smart contract automatically executes one or more rules for performing next actions in the form of a transaction, which in this case is related to transfer of payments from buyer account to seller's account. Upon execution, the transaction is recorded on a blockchain ledger.

In an embodiment of the present invention, the system 100 is a tool that automatically generates templates comprising code (code templates or target code templates) for generating smart contracts for multiple and diverse blockchain platforms from a Domain Specific Language (DSL) input. Automatic generation of templates ensures that platform specific code need not be written for each of the multiple blockchain platforms separately, which in turn leads to saving of time and better utilization of memory. In an embodiment of the present invention, the templates comprising code are generated based on a first parameter and a second parameter. In an exemplary embodiment of the present invention, the first parameter is a source input in the form of a natural language text, which is represented as a DSL construct. In another exemplary embodiment of the present invention, the second parameter is a tag that represents a target blockchain platform (e.g., Ethereum®, R3 Corda®, Hyperledger®, etc.). In an exemplary embodiment of the present invention, the first parameter is a user story. The user story is a formatted natural language text which is received from an external source 124. Based on the first parameter and on the second parameter, that is the tag representative of a target blockchain platform, a target code template comprising code specific to the target blockchain platform is generated. Based on the target code template, a smart contract is automatically generated for execution in the target blockchain platform (target smart contract code).

In various embodiments of the present invention, the system 100 is capable of generating code templates for generating smart contracts (target smart contracts) for all types of block chain platforms (target blockchain platform). Between the source input received from the external source 124 and target smart contract generation, the system 100 carries out multiple functions i.e., lexical analysis, syntax analysis, organized structure creation, semantic analysis, smart contract file generation, target code template mapping to generate the target smart contract for a target blockchain platform. The system 100 is configured to be employed in all blockchain platforms alleviating the need to write specific codes as per specifications and programming language requirements of each platform and alleviating the requirement of specific developments tools required for each of the platforms, thereby resulting in increase in efficiency, processing speed, and optimal utilization of memory.

In an embodiment of the present invention, the system 100 may be implemented in a cloud computing architecture in which data, applications, services, and other resources are stored and delivered through shared datacenters. In an exemplary embodiment of the present invention, the functionalities of the system 100 are delivered as software as a service (SAAS) and/or platform as a service (PaaS) over a communication network. In another embodiment of the present invention, the system 100 may be implemented as a client-server architecture, wherein a terminal device accesses a server hosting the system 100 over a communication network.

In an embodiment of the present invention, the input unit 102 receives an input from the external source 124 in the form of a natural language text and formats the natural language text to represent a user story. The user story is defined as the first parameter by the input unit 102. The input unit 102 processes the first parameter to generate a DSL construct. DSL is a computer language with a high-level of abstraction that may be optimized for a specific domain associated with the input received from the external source 124. In an embodiment of the present invention, the generated DSL construct is representative of instructions provided by users. The DSL instructions are written in natural language with specific commands and instructions provided in the user story. In an exemplary embodiment of the present invention, the DSL construct may be representative of digital assets on blockchain platforms where attributes of the DSL construct and actions performed on the DSL construct are used to generate multiple code templates for multiple target blockchain platforms. Advantageously, the DSL construct in user story format is used for generation of tokens for a particular domain using one or more attributes required for the token generation via multiple validation rules and validation messages (as explained in later part of the specification).

In an exemplary embodiment of the present invention, the input unit 102 generates the DSL construct as a JSON® file. The JSON® file is a property file in a JSON® format which lists field names and data types for each attribute used in the DSL construct. The JSON® file enables a user to write a user story without having technical know-how or understanding of technical details. Generation of the JSON® file is an intelligent feature of code template generation by which the input unit 102 may identify at run-time a data type associated with attributes defined in the DSL constructs, even though the attributes were not provided as input. In an exemplary embodiment of the present invention, the DSL construct may be designed textually. In another exemplary embodiment of the present invention, DSL construct may be designed graphically.

In an exemplary embodiment of the present invention, the DSL construct includes syntax such as an asset definition attribute, a function definition attribute and a contract definition attribute that represents the user story in a domain specific format. In an exemplary embodiment of the present invention, the DSL syntax is illustrated herein below:

```
DSL syntax:
// Asset Definition
As a <DomainName> user I want to create asset <Assetname> with properties
[ <property 1>, <property2>, ... ].
// Function or Flow Definition
So that I can [<FunctionName1> which is <FunctionType>, <Functionname2> which
is <FunctionType>, ... ].
// Contract Definition
[I want to validate if <PropertyName> {condition} <Value> then message:
"<Message>" for <FunctionName>]
// A complete user story DSL
As a DTF user for platform quorum I want to create asset invoice asset with asset
properties invoiceId, invoiceAmount, status, programLimit.
So that i can create Invoice which is a creation.
I want to validate if invoiceAmount "is greater than" 1000 then show message: "It
should be greater than 1000" for WorkFlow: createInvoice
```

In an exemplary embodiment of the present invention, the DSL construct may be implemented via an eclipse framework with a pre-determined set of rules for building required DSL construct. In this exemplary embodiment of the present invention, the predetermined set of rules are defined in a structured file of an xtext framework, which is an eclipse framework. The predefined set of rules relate to, but not limited to, keywords, identifiers, statements, and operators used in the DSL. Advantageously, the predetermined set of rules provide guidance to users without know-how of technical details to use the syntax of DSL construct appropriately and ensure that the users conform to DSL grammar requirement, and also provides assistance while writing user stories.

In an embodiment of the present invention, the lexer 106 receives the DSL construct from the input unit 102 and performs a lexical analysis. During lexical analysis, the lexer 106 disintegrates the input DSL construct into a stream of tokens. The token stream is used in the next phase of parsing to generate a required organized structure (explained later in the specification). In an exemplary embodiment of the present invention, the lexer 106 converts a sequence of elements associated with attributes in the DSL construct into a stream of tokens. In an exemplary embodiment of the present invention, the elements in the DSL construct may include, but are not limited to, keywords, identifiers, literals, operators and separators.

In an embodiment of the present invention, the syntax analyzer 108 receives the stream of tokens from the lexer 106 and performs a syntax analysis on the stream of tokens. During the syntax analysis, the syntax analyzer 108 is configured to check if the syntax of the DSL construct is correct as per a grammar file defined for the DSL construct.

Each line of the content of the stream of tokens is checked to identify any discrepancy with respect to a syntactic structure defined in the grammar file. In an exemplary embodiment of the present invention, the grammar file is defined using xtext framework and provides capability for parsing, linking, type checking and compilation of the DSL construct. In the event, an error is detected by the syntax analyzer 108, the parsing fails, and the user is notified of the error through a User Interface (UI) of the system 100. The lines that have been determined to be without any error are marked by the syntax analyzer 108, and constitute the organized structure which is created from error free DSL construct (as explained in detail herein below).

In an embodiment of the present invention, the parser 110 reads each of the marked lines of the stream of tokens received from the syntax analyzer 108. The read marked lines are transformed by the parser 110 into an organized structure. In an exemplary embodiment of the present invention, the organized structure may include an Abstract Syntax Tree (AST). In an exemplary embodiment of the present invention, the AST represents a syntactic structure of the code (target code of the target code template) to be generated in a tree form. Each node represents a construct of the target code. Examples of the construct include, but is not limited to, a name, a marker or a command. Each node has multiple sub-nodes eventually reaching a leaf node that represents smallest constructs of the code. The AST represents a source code of the DSL construct including a structure of the instructions stated in the DSL construct. In an embodiment of the present invention, each node of the AST represents a specific and independent construct of the source code preserving details of the source code. Further, most vital information is preserved that relates to a data type and a location of each data associated with an attribute in the DSL construct.

In an embodiment of the present invention, an order of execution is retained in the AST and the AST comprises of elements such as identifiers, assigned values and required operations that are defined in the DSL construct. The nodes may comprise sub-nodes and sub-nodes may further have sub-nodes that goes on till each independent element of the DSL is listed as a leaf node. In an embodiment of the present invention, the parser 110 generates the AST after performing all error checks and after analyzed text is determined to be error free. In an embodiment of the present invention, the semantic analyzer 112 analyzes semantics of the AST received from the parser 110 without any need to parse the text again. Generation of the AST is considered by the semantic analyzer 112 as indicative of correctness of the syntax in the given text and as a result the same text is not parsed again once the syntax tree is successfully created.

In an embodiment of the present invention, the smart contract file generator 114 generates a file specific to a target blockchain platform based on a second parameter. The second parameter is representative of a tag that is indicative of the target blockchain platform and is received from the input unit 102. In an embodiment of the present invention, the smart contract file generator 114 generates files in an xtend format that is used to generate files specific to the target blockchain platform. In an embodiment of the present invention, each new file type to be generated corresponding to the target blockchain platform has a dedicated xtend file for each of the target blockchain platform. In an exemplary embodiment of the present invention, predefined xtend files conforming to a specific requirement of the target blockchain platform are created. In an example, if the target blockchain platform is Ethereum® then a corresponding xtend file is pre-created by the smart contract file generator 114. In another example, if the target blockchain platform is Corda 3® then xtend files, contract and workflow are pre-created by the smart contract file generator 114. In an exemplary embodiment of the present invention, the xtend files form templates for each type of desired output (target smart contract).

In an embodiment of the present invention, the target smart contract code generator 116 uses the xtend files to generate rules for generation of a code template for respective target blockchain platforms. The xtend files provide flexibility to extend scope of code template generation for a plurality of target blockchain platforms, by way of parallel code generation for a multitude of different blockchain platforms and thereby improving processing capability. In an exemplary embodiment of the present invention, for generating code templates for a Hyperledger® blockchain platform, corresponding xtend files for chain code associated with the Hyperledger® is created by the smart contract file generator 114 as a one-time activity. The target smart contract code generator 116 generates code templates as per specifications provided in the xtend files specific to Hyper ledger® chain code.

In an embodiment of the present invention, the xtend files contain structure of a required output code template. In another embodiment of the present invention, the xtend file for a specific target blockchain platform comprises structure and mapping, functions with implicit conditional checks and events for smart contracts. In an example, for Ethereum® platform a single solidity code template with required structure, functions, mappings, data and conditions is generated from a single xtend file conforming to Ethereum® smart contract specifications. In another example, three different java code files are created for Corda® based blockchain platform as per requirement of structure of smart contracts for the Corda® based blockchain platform. The structure includes details such as storage of files for a particular state, data used in a smart contract, contract which defines conditions in the smart contract, and workflow that defines orchestration of code which is coded in the three separate files.

In an embodiment of the present invention, the target smart contract code generator 116 fetches the AST from the semantic analyzer 112 and relevant xtend files associated with the target blockchain platform from the smart contract file generator 114. The target smart contract code generator 116 then maps the AST with the xtend files to generate code templates (target code template) for the smart contracts for each of the target platforms. During generation of target code templates for respective target blockchain platforms, the target smart contract code generator 116 picks up code snippets values from the AST and merges them with respective xtend files to create the target code template for the target smart contract corresponding to the target blockchain platform. Since the AST is semantically and syntactically analyzed, the target smart contract code generator 116 replaces placeholder values in the xtend files with code snippet values from the AST.

In an exemplary embodiment of the present invention, in the event the target blockchain platform is identified as Ethereum®, the target smart contract code generator 116 fetches the corresponding xtend file from the smart contract file generator 114. The xtend file comprises structure of a solidity file which represents a smart contract for the Ethereum® blockchain platform. The target smart contract code generator 116 employs the xtend file to generate a code template for the solidity smart contract by processing the AST from the semantic analyzer 112. Elements of DSL construct are replaced with actual input received from a user.

In another exemplary embodiment of the present invention, the target smart contract code generator 116 fetches specific files from the smart contract file generator 114 in the event the target blockchain platform is identified as Corda®. The target smart contract code generator 116 then generates a code template for the smart contract by processing the AST fetched from the semantic analyzer 112 and employing the xtend files for the Corda® blockchain platform. In an exemplary embodiment of the present invention, the target smart contract code generator 116 generates java files for generating states, contract and workflow code files for the Corda® blockchain platform. In another embodiment of the present invention, the target smart contract code generator 116 fetches AST from the semantic analyzer 112 and corresponding xtend files for a different blockchain platform like Hyperledger® chain code from the smart contract file generator 114. In this case, the AST is generated from the DSL construct for Ethereum® and/or Corda® blockchain platforms. The target smart contract code generator 116 generates a code template for Hyperledge® chain code in GoLang®.

In an embodiment of the present invention, the code templates of the smart contracts generated by the target smart contract code generator 116 are rendered via the output unit 118. Based on the code templates rendered, deployable smart contracts are generated for respective target blockchain platforms via the target smart contract code generator 116 and rendered via the output unit 118. The code template rendered is illustrated herein below in an exemplary embodiment of the present invention:

---
DomainName
  a) Corda
    • Contracts
    • Flows
    • States
  b) Ethereum
    • Solidity Smart contract

---

Figure 2:
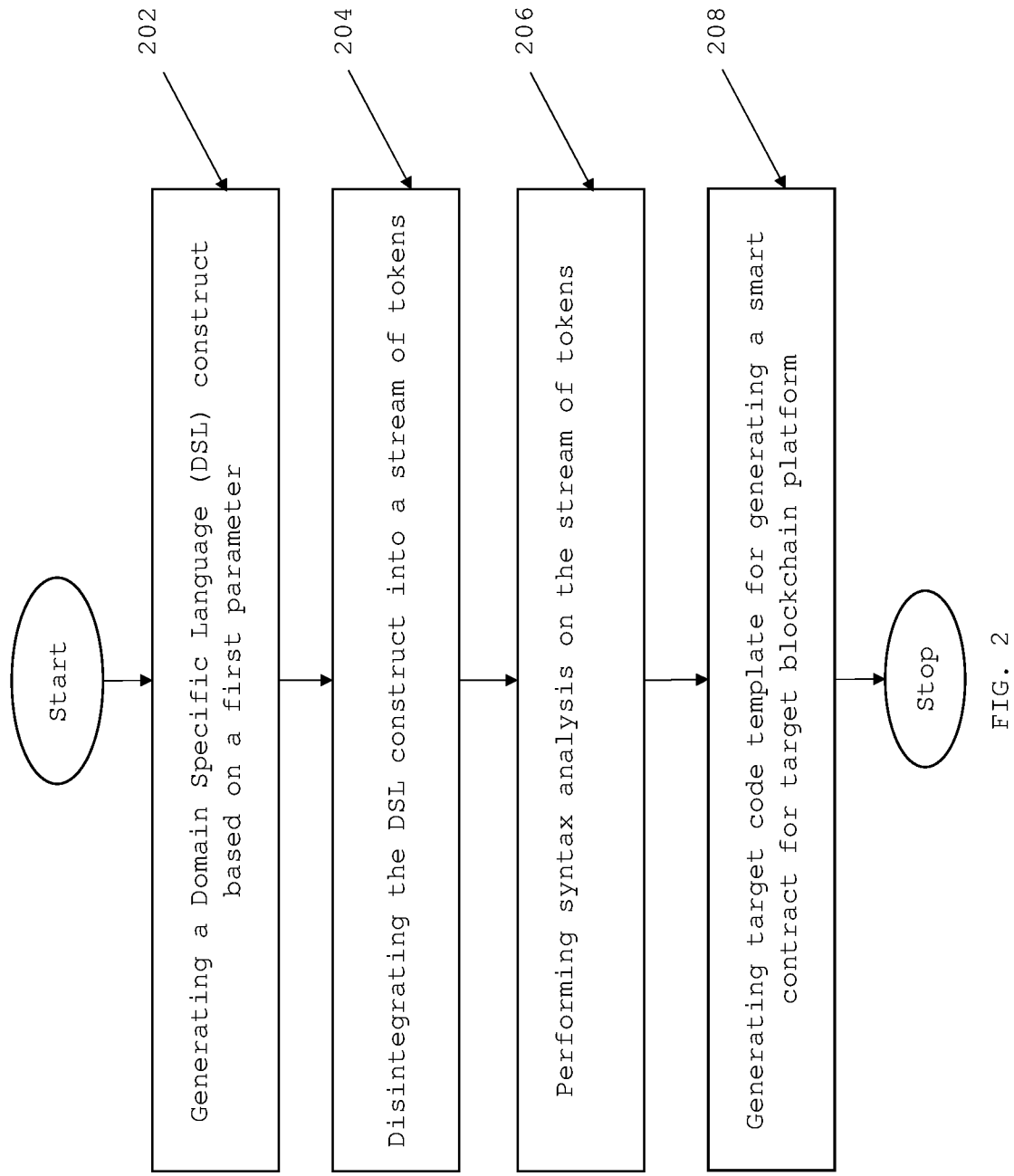
FIG. 2 is a flowchart illustrating a method for automatic generation of smart contracts for different types of blockchain platforms, in accordance with various embodiments of the present invention.

FIG. 2 is a flowchart illustrating a method for automatic generation of smart contracts for different types of blockchain platforms, in accordance with various embodiments of the present invention.

At step 202, a Domain Specific Language (DSL) construct is generated based on a first parameter. In an embodiment of the present invention, an input is received from an external source in the form of a natural language text which is processed to generate a first parameter. In an exemplary embodiment of the present invention, the first parameter is a user story which is generated by formatting the natural language text. The first parameter is processed to generate a DSL construct. DSL is a computer language with a high-level of abstraction that may be optimized for a specific domain associated with the input received from the external source. In an embodiment of the present invention, the generated DSL construct is representative of instructions provided by users. The DSL instructions are written in natural language with specific commands and instructions provided in the user story.

In an exemplary embodiment of the present invention, the DSL construct is generated as a JSON file. The JSON file is a property file in a JSON format which lists field names and data types for each attribute used in the DSL. The JSON file enables a user to write a user story without having technical know-how or understanding of technical details. The generated JSON file is an intelligent feature of code template generation by which a data type associated with attributes used in the DSL construct is identified at run-time in the DSL construct, even though the attributes were not provided as input. In an exemplary embodiment of the present invention, the DSL construct may be designed textually. In another exemplary embodiment of the present invention, DSL construct may be designed graphically.

In an exemplary embodiment of the present invention, the DSL construct includes syntax such as an asset definition attribute, a function definition attribute and a contract definition attribute that represents the user story in a domain specific format. In an exemplary embodiment of the present invention, the DSL construct may be implemented via an eclipse framework with a pre-determined set of rules for building a required DSL construct. In this exemplary embodiment of the present invention, the predetermined set of rules are defined in a structured file of an xtext framework. The predefined set of rules include, but are not limited, to keywords, identifiers, statements, and operators used in the DSL construct.

At step 204, the DSL construct is disintegrated into a stream of tokens. In an embodiment of the present invention, a lexical analysis is performed on the DSL construct. During the lexical analysis, the DSL construct is broken down into a stream of tokens. In an exemplary embodiment of the present invention, a sequence of elements in the DSL construct is converted into a stream of tokens. The elements in DSL may include, but are not limited to, keyword, identifier, literals, operators and separators.

At step 206, a semantic analysis is performed on the stream of tokens. In an embodiment of the present invention, during the syntax analysis, it is checked if the syntax of the DSL construct is correct as per a grammar file defined for the DSL construct. Each line of the content of the stream of tokens is checked to identify any discrepancy with respect to a syntactic structure defined in the grammar file. The grammar file is defined using xtext and provides capability for parsing, linking, type checking and compilation of the DSL construct. In case an error is detected, the parsing fails, and the user is notified of the error through a User Interface (UI). The lines that have been determined to be without any error are marked and constitute the organized structure, which is created from error free DSL construct (as explained in detail herein below).

In an embodiment of the present invention, each of the marked lines of the stream of tokens is read. The read marked lines are transformed into an organized structure. In an exemplary embodiment of the present invention, the organized structure may include an Abstract Syntax Tree (AST). The AST represents a syntactic structure of the code associated with the target code template. Each node of the AST represents a construct of the code associated with the target code template. Examples of the construct include, but are not limited to, a name, a marker or a command. Each node has multiple sub-nodes eventually reaching a leaf node that represents smallest constructs of code. The AST represents a source code of the DSL construct including a structure of the instructions stated in the DSL construct. In an embodiment of the present invention, each node of the AST represents a specific and independent construct of the source code preserving details of the source code. Further, most vital information is preserved that relates to a data type and a location of each data in the DSL construct.

In this exemplary embodiment of the present invention, the AST comprises of identifiers, assigned values and required operations that are defined in the DSL construct, and an order of execution is retained in the AST. The nodes may comprise sub-nodes and sub-nodes may further comprise sub-nodes that goes on till each independent element of the DSL construct is listed as a leaf node. In an embodiment of the present invention, the AST is generated after performing all error checks and after analyzed text is determined to be error free. In an embodiment of the present invention, the semantics of the AST is analyzed without need to parse the text again. Generation of the AST is considered as indicative of correctness of the syntax in the given text and as a result the same text is not parsed again once the syntax tree is successfully created.

At step 208, a target code template is generated for generating a smart contract for target blockchain platform. In an embodiment of the present invention, a file specific to a target blockchain platform is generated based on a second parameter. The second parameter is representative of a tag that is indicative of the target blockchain platform. In an embodiment of the present invention, files are generated in an xtend format that is used to generate files specific to the target blockchain platform. In an embodiment of the present invention, each new file type to be generated corresponding to the target blockchain platform has a dedicated xtend file for each of the target blockchain platform. In an exemplary embodiment of the present invention, predefined xtend files conforming to a specific requirement of the target blockchain platform are created. In an example, if the target blockchain platform is Ethereum® then a corresponding xtend file is pre-created. In another example, if the target blockchain platform is Corda 3® then xtend files, contract and workflow are pre-created. In an embodiment of the present invention, the xtend files form templates for each type of desired output.

In an embodiment of the present invention, xtend files are used to generate rules for generation of a code template for respective target blockchain platforms. The xtend files provide flexibility to extend scope of code template generation for a plurality of target blockchain platforms, by way of parallel code generation for a multitude of different blockchain platforms and thereby improving processing capability. Based on specifications provided in the xtend files specific to the target blockchain platform, the target code template is generated.

In an embodiment of the present invention, the xtend files contain structure, mappings, functions with implicit conditional checks and events for smart contracts of respective target blockchain platforms. In an example, for Ethereum® platform a single solidity code template with required structure, functions, mappings, data and conditions is generated from a single xtend file conforming to Ethereum® smart contract specification.

In an embodiment of the present invention, the AST and relevant xtend files associated with the target blockchain platform are fetched. The AST is mapped with xtend files to generate code templates (target code template) for the smart contracts for each of the target blockchain platforms. During generation of target code templates for respective target blockchain platforms, code snippets values are picked up from the AST and merged with respective xtend files to create the target code template for the target smart contract corresponding to the target blockchain platform. Since the AST is semantically and syntactically analyzed, placeholder values are replaced in the xtend file with code snippet values from the AST.

In an exemplary embodiment of the present invention, in the event the target blockchain platform is identified as Ethereum® based on the second parameter, a corresponding xtend file is fetched. The xtend file comprises a structure of a solidity file which represents a smart contract for the Ethereum® blockchain platform. The xtend file is employed to generate a code template for a solidity smart contract by processing the AST. Elements of DSL construct are replaced with actual input received from a user. In another exemplary embodiment of the present invention, a specific xtend file is fetched in the event the target blockchain platform is identified as Corda®. A code template is generated for generating a smart contract by mapping AST with the xtend file fetched for the Corda®blockchain platform.

In an embodiment of the present invention, the code templates of the smart contracts generated are rendered via an output unit. Based on the code templates rendered, deployable target smart contracts are generated for respective target blockchain platforms.

Advantageously, in various embodiments of the present invention, the system 100 is a tool that generates code templates directly from text written in a spoken English language, leading to a low-code or no-code mechanism for developing smart contracts for multiple platforms. The system 100 provides for an integrated tool which is platform agnostic with the capability to generate code templates for multiple blockchain platforms. The tool may be expanded to a plurality of blockchain platforms, and a user without technical know-how does not have to make any changes to the DSL construct already created or even new DSL constructs created by users. Different blockchain platforms have differences in type and number of code files and these differences are handled by the system 100 by generating platform specific code templates automatically, in accordance with various embodiment of the present invention.

Figure 3:
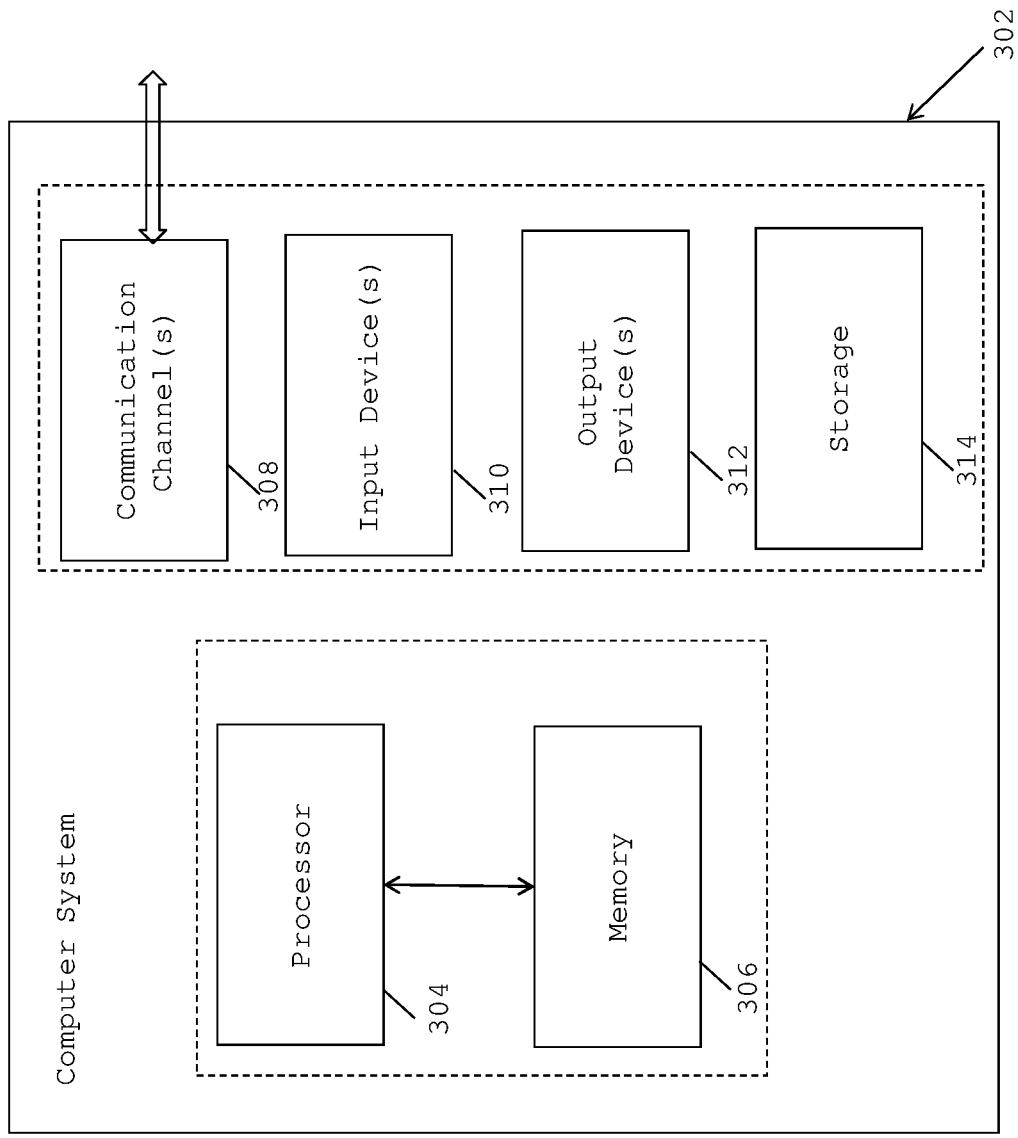
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A system for generating smart contracts for blockchain platforms, the system comprising:
a memory storing program instructions;
a processor executing program instructions stored in the memory and configured to execute a template generator engine to:
process input received as a natural language text into a first parameter to generate a Domain Specific Language (DSL) construct;
disintegrate the DSL construct into a stream of tokens;
perform a syntax analysis on the stream of tokens to check if the syntax of the DSL construct matches with a grammar file defined for the DSL construct, wherein the lines in the steam of tokens without error are marked;
read each of the marked lines of the stream of tokens and transform the read marked lines into an organized structure;
generate a file specific to a target blockchain platform based on a second parameter; and
map the organized structure with the generated file associated with the target blockchain platform to generate a target code template for generating a deployable target smart contract for the target blockchain platform, wherein the organized structure is an Abstract Syntax Tree (AST) that represents a source code corresponding to the DSL construct including a structure of instructions stated in the DSL construct.

2. The system as claimed in claim 1, wherein the template generator engine comprises an input unit to process the first parameter comprising a formatted user story to generate the DSL construct, wherein a JSON file is created to list field names and data types for each attribute used in the DSL construct.

3. The system as claimed in claim 1, wherein the DSL construct is implemented via an eclipse framework with a pre-determined set of rules for building the DSL construct, wherein the predetermined set of rules are defined in a structured file of an xtext framework, the predefined set of rules including keywords, identifiers, statements, and operators used in the DSL construct.

4. The system as claimed in claim 1, wherein the DSL construct comprises syntax including an asset definition attribute, a function definition attribute and a contract definition attribute that represents the user story in a domain specific format.

5. The system as claimed in claim 1, wherein each line of the stream of tokens is checked to identify any discrepancy with respect to a syntactic structure defined in the grammar file for the DSL construct.

6. The system as claimed in claim 1, wherein the template generator engine comprises a lexer to define the grammar file for the DSL construct, and wherein the grammar file is defined using xtext and provides capability for parsing, linking, type checking and compilation of the DSL construct.

7. The system as claimed in claim 1, wherein each node of the AST represents a specific and independent construct of the source code preserving details of the source code.

8. The system as claimed in claim 1, wherein the AST comprises identifiers, assigned values and required operations that are defined in the DSL construct, and order of executions is retained in the AST.

9. The system as claimed in claim 1, wherein the template generator engine comprises a semantic analyzer to analyze semantics of the organized structure without need to parse the DSL construct again, wherein generation of the organized structure is considered as indicative of correctness of the syntax in the DSL construct.

10. The system as claimed in claim 1, wherein the template generator engine comprises a smart contract file generator to generate the second parameter indicative of the target blockchain platform based on a tag received from an input unit to generate the file in an xtend format (xtend file) specific to the target blockchain platform, wherein the xtend file comprises a structure required for generating the target code template.

11. The system as claimed in claim 10, wherein the target smart contract code generator to pick up code snippets values from the AST and merge it with respective xtend files to create the target code template, wherein placeholder values in the xtend files are replaced with code snippet values from the AST.

12. The system as claimed in claim 1, wherein the template generator engine comprises a target smart contract code generator that maps the file generated by a smart contract file generator in the template generator engine with the organized structure from a semantic analyzer in the template generator engine to generate the target code template.

13. The system as claimed in claim 1, wherein the file generated for a specific target blockchain platform comprises structure, mappings, functions with implicit conditional checks and events for smart contracts.

14. The system as claimed in claim 1, wherein a single solidity code template with required structure, functions, mappings, data and conditions is generated from a single xtend file.

15. A method for generating smart contracts for blockchain platforms, the method comprising:
    processing, by a processor, input received as a natural language text into a first parameter to generate a Domain Specific Language (DSL) construct;
    disintegrating the DSL construct into a stream of tokens;
    performing a syntax analysis on the stream of tokens to check if the syntax of the DSL construct matches with a grammar file defined for the DSL construct, wherein the lines in the steam of tokens without errors are marked;
    reading each of the marked lines of the stream of tokens and transforming the read marked lines into an organized structure;
    generating a file specific to a target blockchain platform based on a second parameter; and
    mapping the organized structure with the generated file associated with the target blockchain platform to generate a target code template for generating a target smart contract for the target blockchain platform-, wherein the organized structure comprises creating an Abstract Syntax Tree (AST), the AST represents a source code of the DSL construct including a structure of instructions stated in the DSL construct.

16. The method as claimed in claim 15, wherein the step of processing comprises processing the first parameter including a formatted user story to generate the DSL construct, wherein a JSON file is created to list field names and data types for each attribute used in the DSL construct.

17. The method as claimed in claim 15, wherein the DSL construct is implemented via an eclipse framework with a pre-determined set of rules for building the DSL construct, wherein the predetermined set of rules are defined in a structured file of an xtext framework, the predefined set of rules including keywords, identifiers, statements, and operators used in the DSL construct.

18. The method as claimed in claim 15, wherein the DSL construct comprises syntax including an asset definition attribute, a function definition attribute and a contract definition attribute that represents the user story in a domain specific format.

19. The method as claimed in claim 15, wherein the step of disintegrating the DSL construct comprises converting a sequence of elements associated with attributed in the DSL construct into the stream of tokens, the elements comprising keywords, identifies, literals, operators and separators.

20. The method as claimed in claim 15, wherein the step of performing a syntax analysis comprises checking each line of the stream of tokens to identify any discrepancy with respect to a syntactic structure defined in the grammar file for the DSL construct, the grammar file is defined using xtext and provides capability for parsing, linking, type checking and compilation of the DSL construct.

21. The method as claimed in claim 15, wherein each node of the AST represents a specific and independent construct of the source code preserving details of the source code, and wherein order of executions are retained in the AST, the AST comprising identifiers, assigned values and required operations that are defined in the DSL construct.

22. The method as claimed in claim 15, wherein semantics of the AST are analyzed without the need to parse the DSL construct again, wherein generation of the organized structure is considered as indicative of correctness of the syntax in the DSL construct.

23. The system as claimed in claim 15, wherein the step of generating the file comprises generating the file in an xtend format (xtend file) which is specific to the target blockchain platform, the xtend file comprises a structure, mappings, functions with implicit conditional checks and events required for generating the target code template for generating the target smart contract.

24. The method as claimed in claim 23, wherein the step of mapping comprises mapping the xtend file with the AST to generate the target code template.

25. The method as claimed in claim 23, wherein the step of mapping comprises picking up code snippets values from the AST and merging the code snippets values with respective xtend files to create the target code template, wherein placeholder values in the xtend files are replaced with code snippet values from the organized structure.

26. The method as claimed in claim 15, wherein the target code template is a single solidity code template with required structure, functions, mappings, data and conditions which is generated from a single xtend file.

27. A computer program product comprising:
    a non-transitory computer-readable medium having computer program code stored thereon, the computer-readable program code comprising instructions that, when executed by a processor, causes the processor to:
    process input received as a natural language text into a first parameter to generate a Domain Specific Language (DSL) construct;
    disintegrate the DSL construct into a stream of tokens;
    perform a syntax analysis on the stream of tokens to check if the syntax of the DSL construct matches with a grammar file defined for the DSL construct, wherein the lines in the steam of tokens without error are marked;
    read each of the marked lines of the stream of tokens and transform the read marked lines into an organized structure;
    generate a file specific to a target blockchain platform based on a second parameter; and
    map the organized structure with the generated file associated with the target blockchain platform to generate a target code template for generating a deployable target smart contract for the target blockchain platform, wherein the organized structure is an Abstract Syntax Tree (AST) that represents a source code corresponding to the DSL construct including a structure of instructions stated in the DSL construct.

* * * * *